US010102675B2

(12) United States Patent
Fan et al.

(10) Patent No.: US 10,102,675 B2
(45) Date of Patent: Oct. 16, 2018

(54) METHOD AND TECHNICAL EQUIPMENT FOR DETERMINING A POSE OF A DEVICE

(71) Applicant: Nokia Technologies Oy, Espoo (FI)

(72) Inventors: Lixin Fan, Tampere (FI); Ville-Veikko Mattila, Tampere (FI); Yu You, Kangasala (FI); Kimmo Roimela, Tampere (FI); Junsheng Fu, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 23 days.

(21) Appl. No.: 15/319,908

(22) PCT Filed: Jun. 27, 2014

(86) PCT No.: PCT/FI2014/050532
§ 371 (c)(1),
(2) Date: Dec. 19, 2016

(87) PCT Pub. No.: WO2015/197908
PCT Pub. Date: Dec. 30, 2015

(65) Prior Publication Data
US 2017/0132843 A1    May 11, 2017

(51) Int. Cl.
*G06T 7/70*      (2017.01)
*G06T 19/00*    (2011.01)
(Continued)

(52) U.S. Cl.
CPC .......... *G06T 19/006* (2013.01); *G01C 21/005* (2013.01); *G01C 21/206* (2013.01);
(Continued)

(58) Field of Classification Search
CPC ............ G06T 7/70; G06T 7/80; G06T 19/006
See application file for complete search history.

(56) References Cited

U.S. PATENT DOCUMENTS

| 8,339,394 B1 * | 12/2012 | Lininger | ................. | G06T 15/04 |
| | | | | 345/419 |
| 2002/0191862 A1 * | 12/2002 | Neumann | ................. | G06T 7/80 |
| | | | | 382/284 |

(Continued)

FOREIGN PATENT DOCUMENTS

WO    WO 2011/048497 A2    4/2011
WO    WO 2014/146292 A1    9/2014
(Continued)

OTHER PUBLICATIONS

Rublee et al., "ORB: An efficient alternative to SIFT or SURF", Nov. 6, 2011, IEEE, pp. 2564-2571.*
(Continued)

*Primary Examiner* — Mark Zimmerman
*Assistant Examiner* — Jonathan M Cofino
(74) *Attorney, Agent, or Firm* — Harrington & Smith

(57) ABSTRACT

The embodiments relate to a method and to technical equipment for implementing the method. The method includes receiving an image with location information from a client; requesting processed region data from a media server based on the location information, said processed region data including one or more images with the corresponding location information; applying a first process for determining a pose of a device for the received image by means of the processed region data; if the first process fails to result the pose of the device, applying a second process for determining a pose of a device for the received image by means of the processed region data; saving the image with the determined pose of the device to the media server; providing the image and the pose of the device to a client for client rendering.

30 Claims, 14 Drawing Sheets

(51) Int. Cl.
*G06T 7/11* (2017.01)
*G06K 9/00* (2006.01)
*G01C 21/00* (2006.01)
*G01C 21/20* (2006.01)

(52) U.S. Cl.
CPC ............ *G06K 9/00671* (2013.01); *G06T 7/11* (2017.01); *G06T 7/70* (2017.01); *G06T 2207/10004* (2013.01); *G06T 2207/30244* (2013.01)

(56) References Cited

U.S. PATENT DOCUMENTS

| | | | |
|---|---|---|---|
| 2006/0242325 A1* | 10/2006 | Ramaswamy | H04H 20/95 709/246 |
| 2014/0185912 A1* | 7/2014 | Lim | G06F 17/30247 382/141 |
| 2014/0285630 A1* | 9/2014 | Sharp | G06T 7/0075 348/47 |
| 2014/0300775 A1 | 10/2014 | Fan et al. | |
| 2015/0161441 A1* | 6/2015 | Robinson | G06K 9/00791 382/113 |
| 2015/0161476 A1* | 6/2015 | Kurz | G06K 9/4671 382/190 |
| 2015/0347846 A1* | 12/2015 | Guzm N-Rivera | G06K 9/6256 382/103 |
| 2016/0104452 A1* | 4/2016 | Guan | G06T 19/006 345/633 |

FOREIGN PATENT DOCUMENTS

| | | |
|---|---|---|
| WO | WO 2014/153724 A1 | 10/2014 |
| WO | WO 2014/162044 A1 | 10/2014 |

OTHER PUBLICATIONS

Yii, W., et al, "Distributed visual processing for augmented reality", Nov. 5, 2012, 2012 IEEE International Symposium on Mixed and Augmented Reality, 1 page, abstract only.

Lim, H., et al., "Real-time Image-based 6-DOF Localization in Large-Scale Environments", 2012 IEEE Conference on Computer Vision and Patterns Recognition, Jun. 16, 2012, 1 page, abstract only.

Wagner, D., et al., "Real-time detection and tracking for augmented reality on mobile phones", May-Jun. 2010, IEEE Transactions of Visualization and Computer Graphics, vol. 16, No. 3, 1 page, abstract only.

Calonder, M., et al., "Brief: Binary Robust Independent Elementary Features", Sep. 5, 2010, European Conference on Computer Vision, 1 page, abstract only.

Junsheng Fu et al. *"Augmented and Interactive Video Playback Based on Global Camera Pose"* Proceedings of the 21$^{st}$ ACM International Conference on Multimedia, MM'13, Oct. 21, 2013 (Oct. 21, 2013), pp. 461-462, XP055355673.

Heng Liu et al. *"Finding Perfect Rendezvous on the Go"* Proceedings of the 20$^{th}$ ACM International Conference on Multimedia, MM'12, Jan. 1, 2012 (Jan. 1, 2012), p. 9, XP055282553.

Ventura Jonathan et al. *"Global Localization from Monocular SLAM on a Mobile Phone"* IEEE Transactions on Visualization and Computer Graphics, IEEE Service Center, Los Alamitos, CA, US, vol. 20, No. 4, Apr. 1, 2014 (Apr. 1, 2014), pp. 531-539, XP011543580.

\* cited by examiner

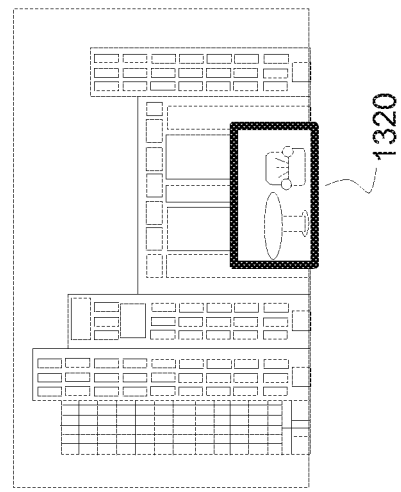
Fig. 13
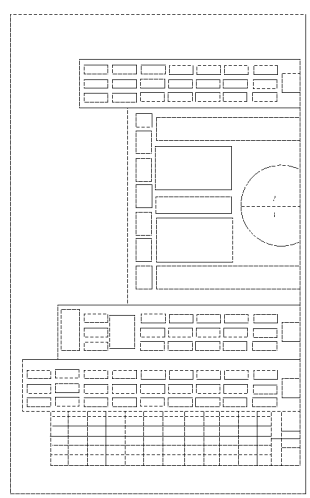
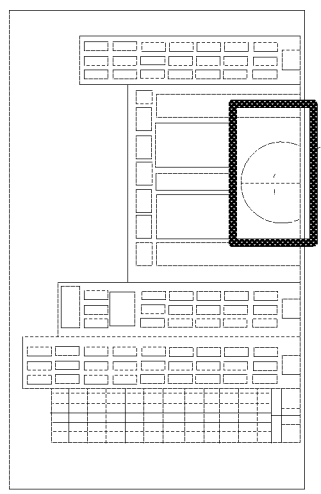

METHOD AND TECHNICAL EQUIPMENT FOR DETERMINING A POSE OF A DEVICE

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Augmented reality is a concept that aims to enhance people's view of the world by superimposing virtual objects on the real world in a way that persuades the viewer that the virtual object is part of the real environment. Mobile augmented reality technology can provide intuitive user experience by utilizing a global camera pose of an image.

There is a need for a solution that improves the camera pose in terms of accuracy and efficiency.

SUMMARY

Now there has been invented an improved method and technical equipment implementing the method targeted to the aforementioned need. Various aspects of the invention include a method, an apparatus, a system, and a computer readable medium comprising a computer program stored therein, which are characterized by what is stated in the independent claims. Various embodiments of the invention are disclosed in the dependent claims.

According to a first aspect, there is provided a method, comprising receiving an image with location information from a client; requesting processed region data from a media server based on the location information, said processed region data comprising one or more images with the corresponding location information; applying a first process for determining a pose of a device for the received image by means of the processed region data; if the first process fails to result the pose of the device, applying a second process for determining a pose of a device for the received image by means of the processed region data; saving the image with the determined pose of the device to the media server; providing the image and the pose of the device to a client for client rendering.

According to a second aspect, there is provided an apparatus comprising at least one processor, memory including computer program code, the memory and the computer program code configured to, with the at least one processor, cause the apparatus to perform at least the following receiving an image with location information from a client; requesting processed region data from a media server based on the location information, said processed region data comprising one or more images with the corresponding location information; applying a first process for determining a pose of a device for the received image by means of the processed region data; if the first process fails to result the pose of the device, applying a second process for determining a pose of a device for the received image by means of the processed region data; saving the image with the determined pose of the device to the media server; providing the image and the pose of the device to a client for client rendering.

According to a third aspect, there is provided a system comprising at least one processor, memory including computer program code, the memory and the computer program code configured to, with the at least one processor, cause the system to perform at least the following receiving an image with location information from a client; requesting processed region data from a media server based on the location information, said processed region data comprising one or more images with the corresponding location information; applying a first process for determining a pose of a device for the received image by means of the processed region data; if the first process fails to result the pose of the device, applying a second process for determining a pose of a device for the received image by means of the processed region data; saving the image with the determined pose of the device to the media server; providing the image and the pose of the device to a client for client rendering.

According to a fourth aspect, there is provided an apparatus comprising at least means for processing; means for storing; means for receiving an image with location information from a client; means for requesting processed region data from a media server based on the location information, said processed region data comprising one or more images with the corresponding location information; means for applying a first process for determining a pose of a device for the received image by means of the processed region data; if the first process fails to result the pose of the device, means for applying a second process for determining a pose of a device for the received image by means of the processed region data; means for saving the image with the determined pose of the device to the media server; means for providing the image and the pose of the device to a client for client rendering.

According to a fifth aspect, there is provided a computer program product embodied on a non-transitory computer readable medium, comprising computer program code configured to, when executed on at least one processor, cause an apparatus or a system to implement aforementioned method.

According to an embodiment, if the second process fails to result the pose of the device, applying a third process for determining a pose of a device for the received image.

According to an embodiment, the third process is a sensor based approach.

According to an embodiment, the first process is a fast localization method.

According to an embodiment, the second process is a coordinate tagging method or a sensor based approach.

According to an embodiment, the media server comprises data categorized in processed regions and unprocessed regions.

According to an embodiment, the pose of the device determined either according to the fast localization method or the coordinate tagging method is saved with the image to the processed region.

According to an embodiment, the pose of the device determined according to the sensor based approach is saved with the image to the unprocessed region.

According to an embodiment, it is detected when the images in the unprocessed region reaches a predefined threshold, wherein the method comprises transferring the images from the unprocessed region to processed region.

According to an embodiment, the image comprises a complete image or extracted image features.

According to an embodiment, the media server is an intelligent media cloud.

According to an embodiment, the image is an outdoor image.

According to an embodiment, the image is an indoor image.

According to an embodiment, a local camera pose is determined for the indoor image, and transforming the local camera pose to a global camera pose.

According to an embodiment, the device is a camera.

According to an embodiment, the image has been captured by the device.

According to an embodiment, the location information is related to the client and/or the device.

According to a sixth aspect, there is provided a method for determining a pose of a device, comprising receiving an image from a client; determining a global camera pose for the image; returning metadata comprising at least the global camera pose to the client; receiving a request from the client, said request comprising a request for media content based on the global camera pose of the image; returning the media content to the client.

According to a seventh aspect, there is provided an apparatus comprising at least one processor, memory including computer program code, the memory and the computer program code configured to, with the at least one processor, cause the apparatus to perform at least the following receiving an image from a client; determining a global camera pose for the image; returning metadata comprising at least the global camera pose to the client; receiving a request from the client, said request comprising a request for media content based on the global camera pose of the image; returning the media content to the client.

According to a eighth aspect, there is provided a computer program product embodied on a non-transitory computer readable medium, comprising computer program code configured to, when executed on at least one processor, cause an apparatus or a system to implement a method according to sixth aspect.

According to an ninth aspect, there is provided an apparatus comprising at least means for processing; means for storing; means for receiving an image from a client; means for determining a global camera pose for the image; means for returning metadata comprising at least the global camera pose to the client; means for receiving a request from the client, said request comprising a request for media content based on the global camera pose of the image; means returning the media content to the client.

According to an embodiment, the image is an indoor image.

According to an embodiment, the image is an outdoor image.

According to an embodiment, the metadata further comprises at least one of the following: a field of view, focal length, depths, image aspect.

DESCRIPTION OF THE DRAWINGS

In the following, various embodiments of the invention will be described in more detail with reference to the appended drawings, in which
FIG. 13 shows an example of a street-view x-ray.

DESCRIPTION OF EXAMPLE EMBODIMENTS

Figure 10:
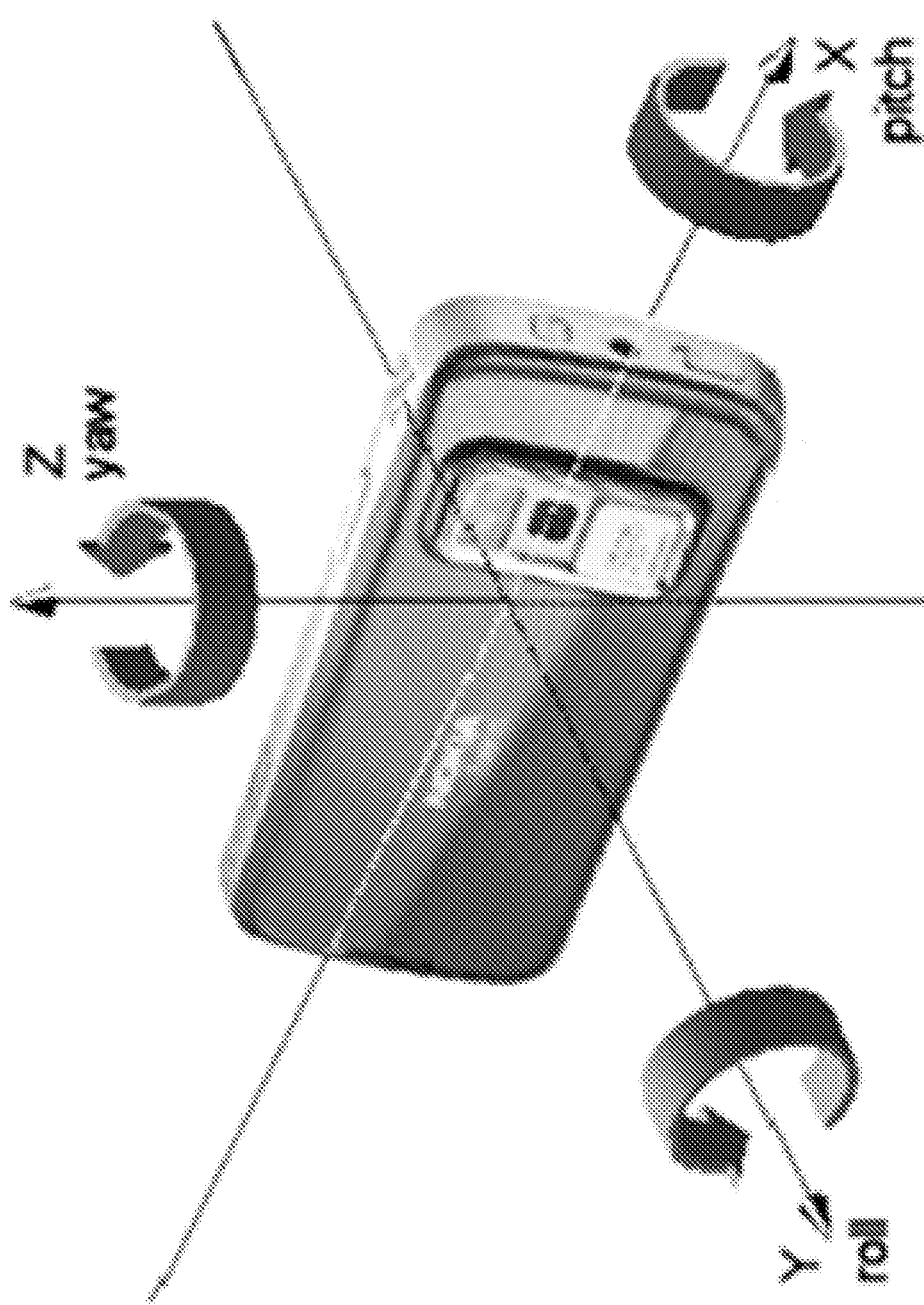
FIG. 10 shows an example of a camera orientation in a 3D space.
Figure 11:
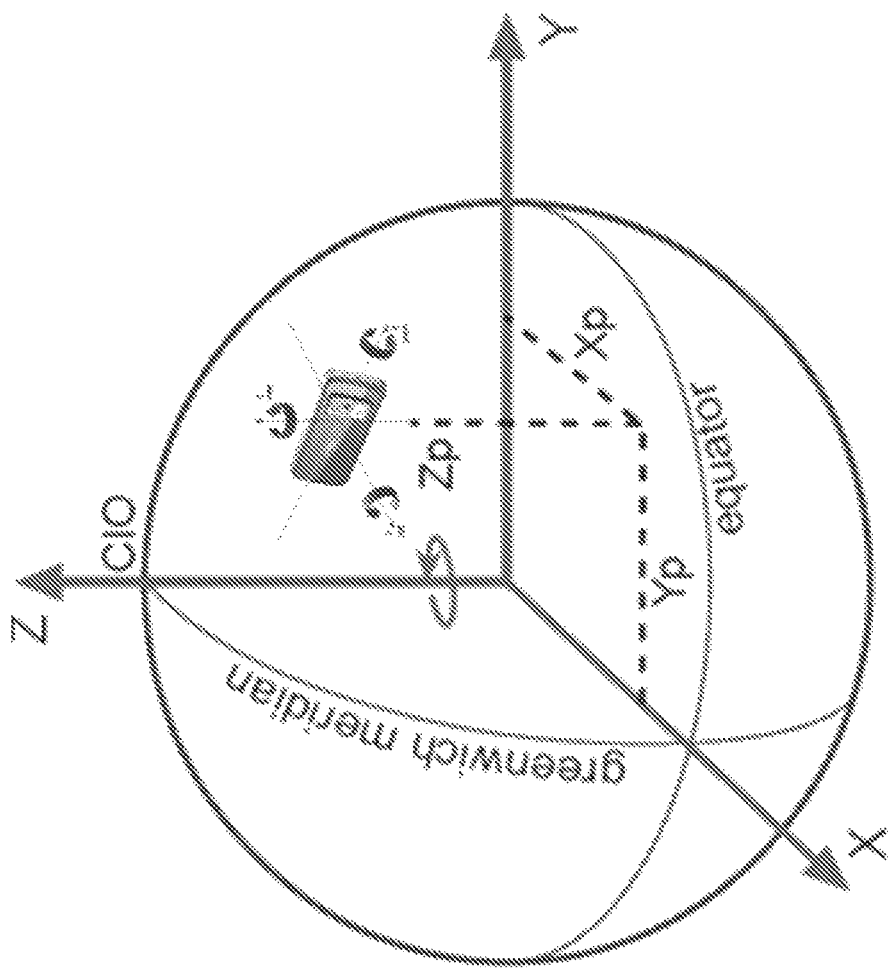
FIG. 11 shows an example of a camera pose in the Earth-Centered, Earth-Fixed Cartesian coordinate system (CCS_3D_ECEF)

In the following, several embodiments of the invention will be described in the context of camera pose in augmented reality applications. The camera pose of associated images represents 3D locations and orientations of the camera at the time when the image was taken. The camera location can be simply described as $x_L$, $y_L$, $z_L$. The orientation can be described as the roll, yaw and pitch angles of rotating the camera from a reference placement to its current placement (see FIG. 10). Also, the orientation can be represented by rotation matrices or quaternions, which are mathematically equivalent to Euler angles. With the camera location and orientation, one can define the camera movement with six degrees of freedom (6-DoF) in a coordinate system. The present embodiments particularly relate to the camera pose defined in the CCS_3D_ECEF system (FIG. 11).

Figure 2:
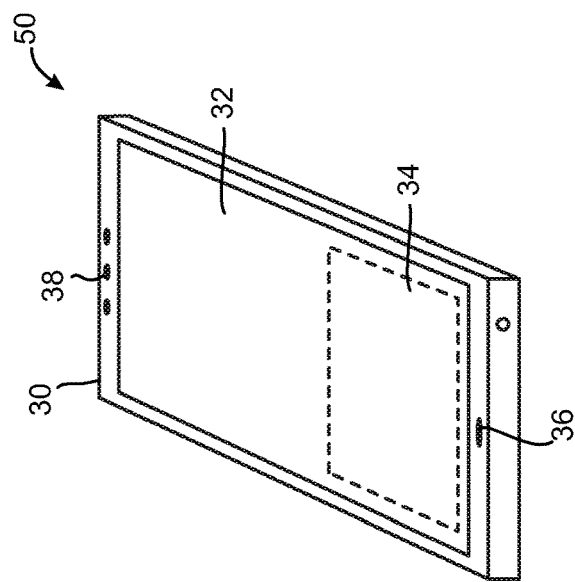
FIG. 2 shows an embodiment of a layout of an apparatus.
Figure 1:
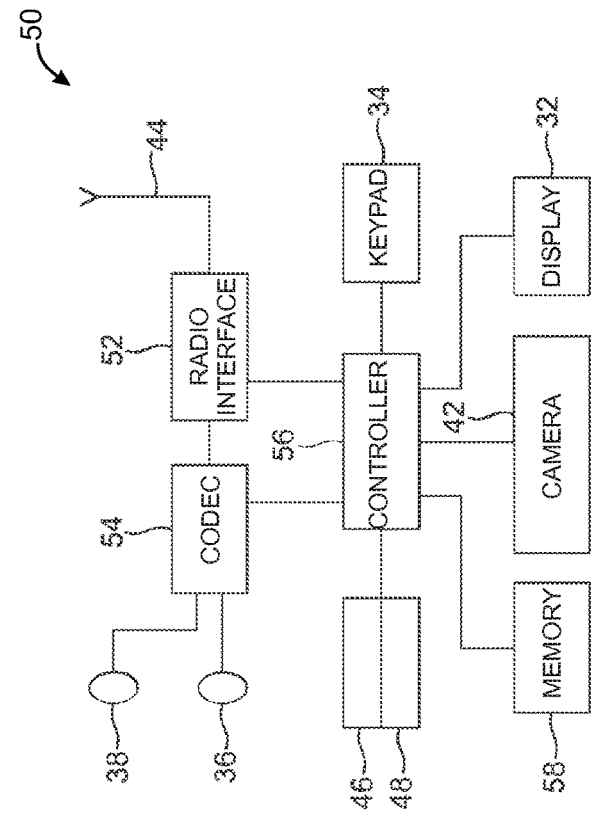
FIG. 1 shows an embodiment of an apparatus.

FIGS. 1 and 2 illustrate an apparatus according to an embodiment. The apparatus 50 is an electronic device for example a mobile terminal or a user equipment of a wireless communication system. The embodiments disclosed in this application can be implemented within any electronic device or apparatus which is able to process image data, such as still images, alternatively also video images. The apparatus 50 may comprise a housing 30 for incorporating and protecting the device. The apparatus 50 may further comprise a display 32 in the form of a liquid crystal display or LED (Light Emitting Diodes) display. According to an embodiment, the display may be any suitable display technology suitable to display an image or video. The apparatus 50 may further comprise a keypad 34. According to an embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which may be any of the following: an earpiece 38, a speaker or an analogue audio or digital audio output connection. The apparatus 50 may also comprise a battery (according to another embodiment, the device may be powered by any suitable mobile energy device, such as solar cell, fuel cell or clockwork generator). The apparatus may further comprise a camera 42 capable of recording or capturing images and/or video, or may be connected to one. The camera 42 may be capable of recording or detecting individual frames which are then passed to the codec 54 or controller for processing. According to an embodiment, the apparatus may receive the image data for processing from another device prior to transmission and/or storage. According to an embodiment, the apparatus 50 may receive either wirelessly or by a wired connection the image for processing. The camera 42 comprises an image sensor for converting an optical image into an electronic signal. The image sensor may be a CCD (Charge-Coupled Device) sensor or a CMOS (Complementary metal-oxide-semiconductor) sensor.

According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired solution.

The apparatus 50 may comprise a controller 56 or processor for controlling the apparatus. The controller 56 may be connected to memory 58 which, according to an embodiment, may store both data in the form of image and audio data, and/or may also store instructions for implementation on the controller 56. The controller 56 may further be connected to codec circuitry 54 suitable for carrying out coding and decoding or audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

According to an embodiment, the apparatus 50 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the apparatus 50 can support any type of interface to the user (such as "wearable" circuitry, etc.).

The apparatus 50 may include or be associated with applications and sensors. In one embodiment, the apparatus 50 has connectivity to an identification platform via the communication network. In one embodiment, the identification platform performs one or more functions associated with processing one or more images to determine camera location information and/or camera pose information, wherein these information are represented according to a global coordinate system, thereby causing, at least in part, an association of these information with the one or more images as meta-data information. Although the various embodiments described herein are discussed with respect to a global coordinate system based on an Earth centered Earth Fixed (ECEF) global coordinate system, it is contemplated that the various embodiments are applicable to any global coordinate system for identifying locations. For example, other applicable global coordinate systems include, but are not limited to, a world geodetic system (WGS84) coordinate system, a universal transverse Mercator (UTM) coordinate system, and the like.

According to an embodiment, the applications may be any type of application that is executable at the apparatus 50, such as media player applications, social networking applications, calendar applications, content provisioning services, location-based service applications, navigation applications and the like. In one embodiment, one of the applications at the apparatus 50 may act as a client for identification platform and perform one or more functions associated with the functions of the identification platform by interacting with the identification platform over communication network.

According to an embodiment, the sensors may be any type of sensor. In certain embodiments, the sensors may include, for example, a camera/imaging sensor for gathering image data, an audio recorder for gathering audio data, a global positioning sensor for gathering location data, a network detection sensor for detecting wireless signals or network data, temporal information and the like. In one scenario, the camera sensors may provide the users of the apparatus 50 with 3D pose estimation, tracking and clustering functions for suitable camera placement. In one scenario, the sensors may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.).

The apparatus 50 may display, via applications, one or more images (e.g. pictures or videos). In one embodiment, one or more elements depicted in one or more images may be landmarks or sites within an image. According to an embodiment, sensors of the apparatus 50 may permit the user to select an element of one or more images. This element selection may then prompt identification platform to process the image data to obtain Global Positioning System (GPS) information associated with the image. The images may depict physical places, but they may also include virtual or computer-generated scenery. In one embodiment, the identification platform may track images, match the images and extract 3D information from the images and then translate the 3D information to the global coordinate system.

Figure 3:
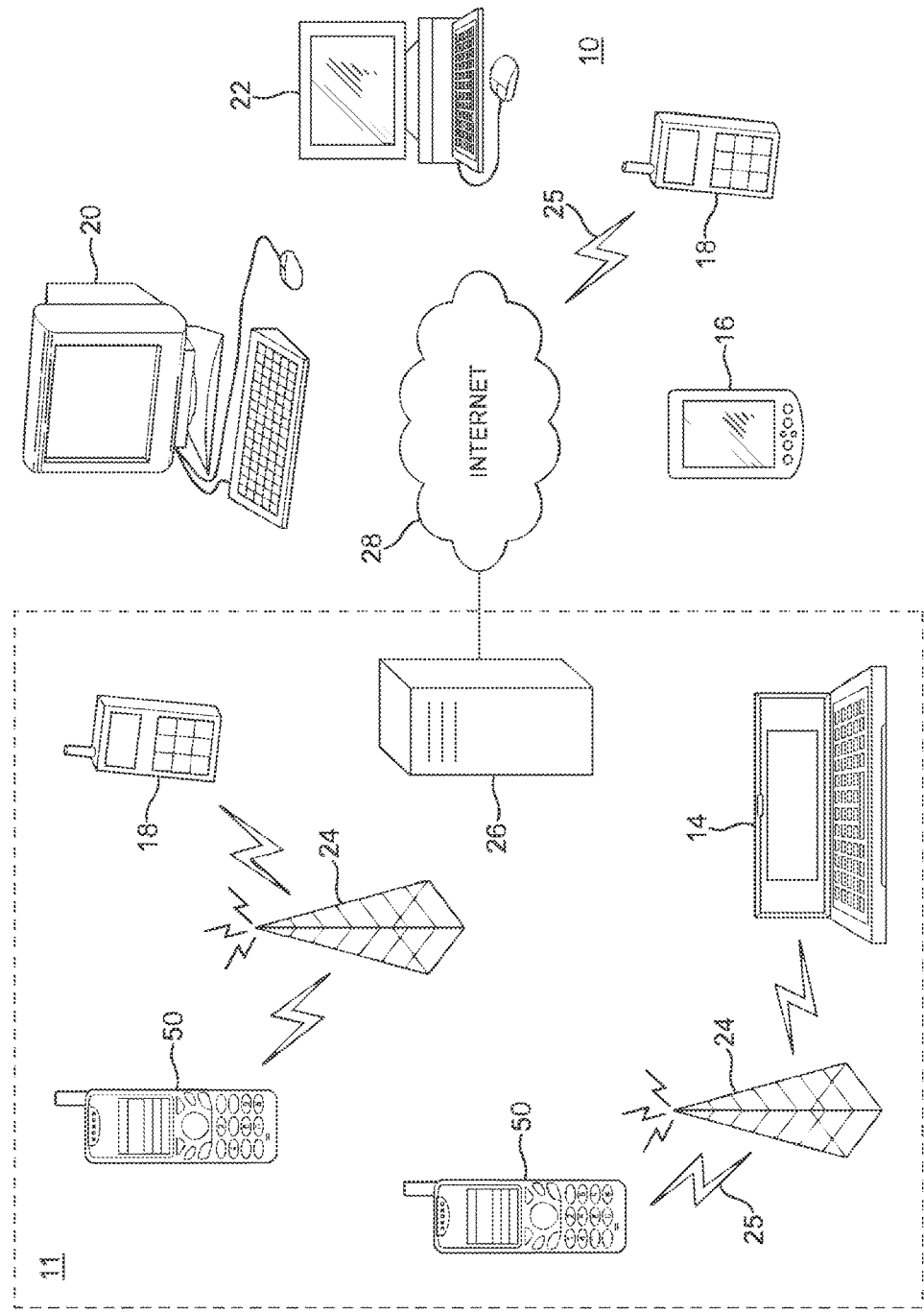
FIG. 3 shows an embodiment of a system.

FIG. 3 shows a system configuration comprising a plurality of apparatuses, networks and network elements according to an embodiment. The system 10 comprises multiple communication devices which can communicate through one or more networks. The system 10 may comprise any combination of wired or wireless networks including, but not limited to a wireless cellular telephone network (such as a GSM, UMTS, CDMA network, etc.), a wireless local area network (WLAN), such as defined by any of the IEEE 802.x standards, a Bluetooth personal area network, an Ethernet local area network, a token ring local area network, a wide area network, and the internet.

The system 10 may include both wired and wireless communication devices or apparatus 50 suitable for implementing present embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

Some of further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telephone system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio infrared, laser, cable connections or any suitable connection.

Related technology knows also a first process for a binary feature based fast camera pose recover approach, which is able to recover camera pose from a pre-registered database within less than 1 second. Such a process has been disclosed in PCT/CN2013/073057. The fast localization pipeline of the first process is configured determine the camera pose of an image. Despite the fast responsive speed, the recovered camera pose is limited within a local coordinate system (this means that the relative position/orientation among different objects is known, but not the exact position/orientation in a global coordinate system). Another shortcoming in this first process lies in the fact that the binary feature matching is more sensitive to varying imaging conditions, thus, the success rate of recovering camera pose is lower as compared with the following (i.e. second) process.

Related technology also knows a second process for determining camera location information and/or camera pose information associated with at least one camera capturing one or more images. Such a process has been disclosed in PCT/FI2014/050167 and U.S. Ser. No. 14/015,610. In such process, a user takes a video with her/his apparatus, said video being automatically uploaded to an ECEF coordinate tagging engine. The ECEF coordinate tagging engine generates a geocoordinate-tagged video data. The ECEF coordinate tagging engine comprises 3D reconstruction component and data alignment component. Once video is uploaded, ECEF coordinate tagging engine extracts the key frames, reconstructs the scene as a 3D point cloud and recovers camera poses with a CCS_3D_Local system. The video is rendered and returned to the user. While this process performs reasonably well in many cases, the processing is time consuming. Often it may take several minutes or longer time for the server to recover the global camera pose. Therefore this second process cannot be used alone in real-time applications.

The present embodiments provide a hybrid real-time camera pose recovery solution and an intelligent media cloud to improve the robustness of a pipeline that is used for recovering the camera pose of the image. The hybrid system according to embodiments is able to recover the camera pose within 1 second in the best case, and on the other hand, the high success rate is maintained even in the worst case. A media server, which according to an embodiment is an intelligent media cloud, is utilized to improve the efficiency and robustness of image registration. The intelligent media cloud is configured to try to improve the registration possibility by providing the updated region data.

Figure 4:
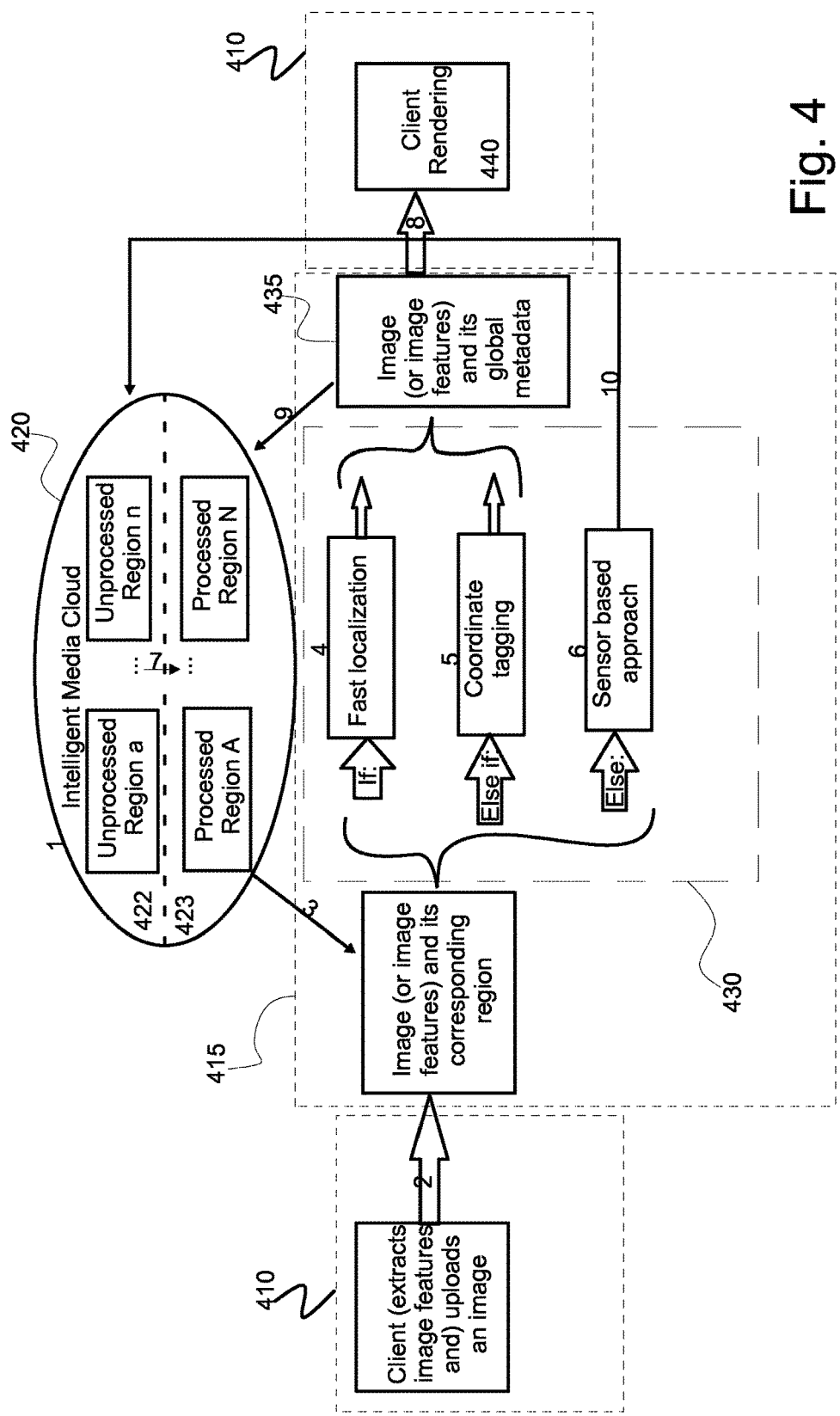
FIG. 4 shows an embodiment of a hybrid registration system with intelligent media cloud.

The system according to an embodiment comprises three parts: a client 410, a media server, such as an intelligent media cloud 420 and a hybrid registration 430, as shown in FIG. 4.

The method steps according to embodiment comprise the following: A 3D city model is generated (1) with a coordinate tagging method according to second process of the related technology by extracting geo-location metadata from street-view images. Such extracted geo-location metadata contains registered images, corresponding camera poses and reconstructed 3D point clouds defined within, for instance, a local 3D Cartesian coordinate system (CCS_3D_Local system) with known origin and axes. The camera poses and point clouds can be uniquely mapped to 3D ECEF Cartesian coordinate system (CCS_3D_ECEF) or other global coordinate system (e.g., WGS84, UTM, etc.). The results are saved into the Intelligent Media Cloud 420, e.g. "Processed Region A", "Processed Region B", etc. thus creating the Intelligent Media Cloud 420.

The client uploads (2) image (or image features, e.g. SIFT (Scale-invariant feature transform) features) together with GPS information to a server 415. The client may either upload the image or the image feature for further processing. The benefit of uploading only the features is to protect user's privacy, e.g. some user may don't want their photos to be stored in the cloud. In the following processes, the server uses image matching for comparing the image features to the images in the intelligent media cloud. Since the image matching only compares the image features, all the processes remain the same even though only features were uploaded at this point.

The server 415 receives (3) from the intelligent media cloud 420 "Processed Region data" that corresponds the uploaded image. The correspondences are determined by the GPS information. In other words, with a given (e.g. outdoor) photo from a mobile device, the server 415 loads a corresponding "processed region data" based on the photo's GPS from the Intelligent Media Cloud 420.

The "Processed region data" and the uploaded image (or image features) from the client 410 are provided to the hybrid registration pipeline 430 as an input.

At first, the hybrid registration pipeline 430 applies a first process, such as the fast localization pipeline (4) of related technology to the "Processed region data" and the uploaded image. If the first process (4) is able to recover the global camera pose, the server 415 saves (9) the image (or image features) together with the information on the camera pose as an image metadata to the Processed region in the Intelligent Media Cloud 420, It is appreciated that the fast localization method takes less than one second to recover the camera pose, when succeeded.

If the hybrid registration pipeline 430 is not able to recover the global camera pose with the first process (4), the hybrid registration pipeline 430 applies a second process, which is a more robust pipeline (known from the second process of the related technology), also known as a coordinate tagging method (5), to determine the photo's camera pose. If the hybrid registration pipeline 430 is able to recover the camera pose, the server 415 saves (9) the image (or image features) together with its metadata 435 comprising the information on the camera pose back to the Processed Region in the Intelligent Media Cloud 420. The coordinate tagging method takes from 1 minute to several minutes to recover the camera pose.

Later, the client may upload a second photo (referred as photo B), whereby the Intelligent Media Cloud may provide the updated region data, which includes the previous photo A. The successful registration chance with fast localization pipeline of the first process will be much increased, because there is a high chance to find the matches between photo A and photo B, which are taken with the same device and environmental conditions. In this way, the system is learning the environment as well as the camera's settings, which results in an improvement in the camera pose tracking.

If the hybrid registration pipeline 430 is neither able to recover the camera pose with the second process, the hybrid registration pipeline 430 is configured to apply a third process, which is to use sensors (6) of the phone to determine the camera pose. The sensors can include one or more of the following: an accelerometer, a gyroscope or a compass. In this case, the server 415 saves (10) the image (or image features) together with its rough camera pose to an Unprocessed Region 422 in the Intelligent Media Cloud 420. So, the next time, the corresponding image(s) can be added as new key frames for fast localization recovery to improve the successful registration rate.

It is appreciated that according to an embodiment, instead of using the coordinate tagging method as the second process, the sensor based approach may be used as the second process.

The reason why the aforementioned processes (4) or (5) may fail, is that the uploaded image may too different from image(s) in the corresponding "Processed Region data", i.e. images may have be taken from a different viewing angle, different lighting condition, or different time of the day.

For example, the fast localization method is able to recover the camera pose, if the uploaded image is not significantly different from image(s) in the corresponding "Processed Region data", i.e. images may have be taken from a similar viewing angle, similar lighting condition, or time of the day. In order to determine that, the extracted binary features (from these two images) can be used to match the images to each other. If the uploaded image has features that can be matched with the features in the images in the "Processed Region data", for example, the coordinate tagging method is able to recover the camera pose, if the first photo (referred as photo A) is somehow different from the images in the corresponding "Processed Region data". This means that the uploaded image may have been taken from quite a different viewing angle, lighting condition, or the time the day. As a result, the binary features extracted from the two images cannot be matched with each other.

For example, the coordinate tagging method is able to recover the camera pose, if the first photo (referred as photo A) is somehow different from the images in the corresponding "Processed Region data". This means that the uploaded image may have been taken from quite a different viewing angle, lighting condition, or the time the day. As a result, the binary features extracted from the two images cannot be matched with each other.

The sensor based approach is needed, if the uploaded image is completely different from the corresponding image in the "Processed Region data", e.g. the corresponding image is a photo of a building, but the uploaded image is a photo taken at the same position but the camera is towards the ground, or the image is taken from a very different environment setting (such as lighting and view). In that case, the uploaded image has no features that could be matched with the features in the images in the "Processed Region data", the server 415.

Finally, as a result (8), the photo and metadata comprising the camera pose are ready to be used in rendering 440 in the client 410. The client 410 renders 440 the photo together with the corresponding "Region data", providing augmented reality applications being discussed later.

As shown in FIG. 4, the intelligent media cloud 420 comprises different regions. The regions correspond to territorial areas. Different regions are divided by locations, and they may have various sizes, e.g. 1 km$^2$ or 2 km$^2$. The sizes can be defined in the server side, and they may vary from hundred square meters to hundred square kilometers. If there are multiple images in the same area but with different time/lighting/weather/seasons conditions, they can be grouped according to the conditions which may greatly improve the successful registration rate of images.

Figure 5:
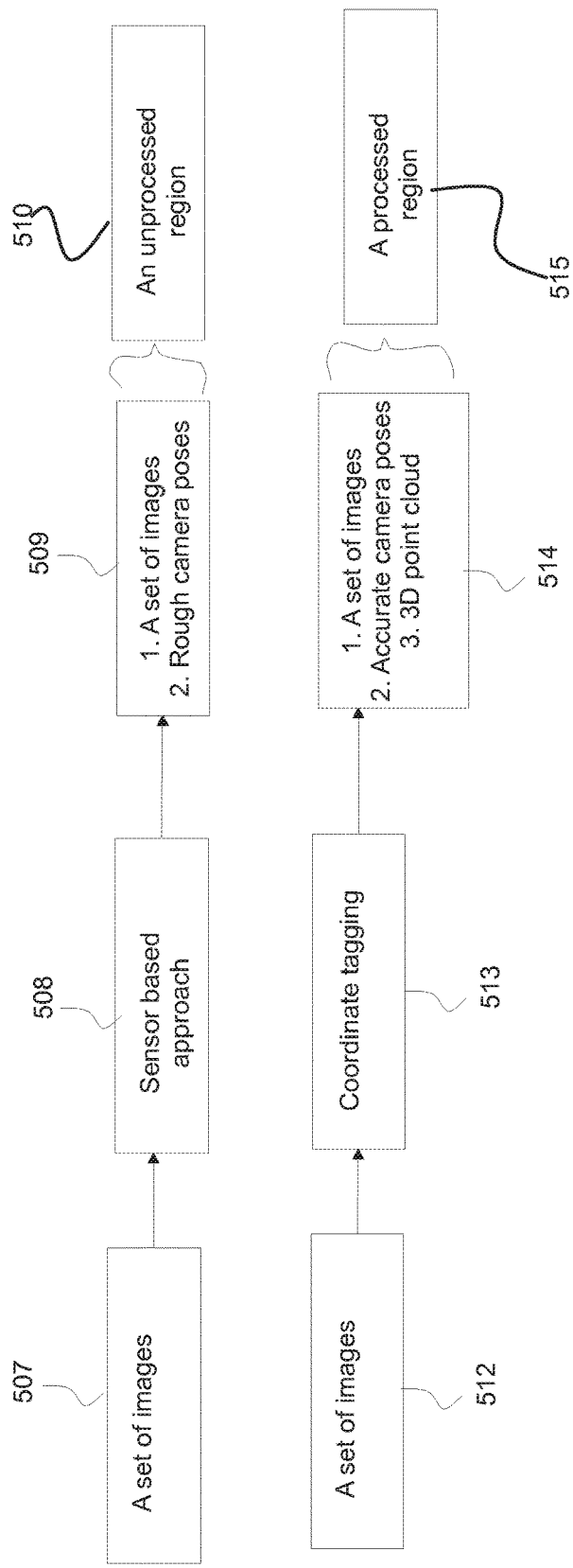
FIG. 5 shows an example of two regions.

There are two types of regions—one is called Processed Region 423 and the other one is called Unprocessed Region 422. The generation of the different regions is illustrated in FIG. 5. The Processed Region 515 (FIG. 4: 423) is generated by a coordinate tagging method 513 known from the second process of the related technology from a set of street-view images 512 as input, and the result 514 comprises a set of images, 3D point clouds and camera poses in a global coordinate system, e.g. ECEF, WGS86. An Unprocessed Regions 510 (FIG. 4:422) comprises only a set of images and their rough camera poses 509 obtained from a sensor data in the camera phone. This type of region is generated by the sensor based approach 508 in the Hybrid Registration (FIG. 4: 6).

There are two main differences between the Processed Region and Unprocessed Region. At first, the Processed Region has accurate camera pose, which can be used as reference in Hybrid Registration, however, the Unprocessed Region only contains the rough camera pose which cannot be used as reference in the Hybrid Registration Step. Secondly, the Unprocessed Region does not contain the 3D point cloud. Furthermore, the two types of Regions are able to grow by adding new images, or both images and 3D point clouds.

Figure 6:
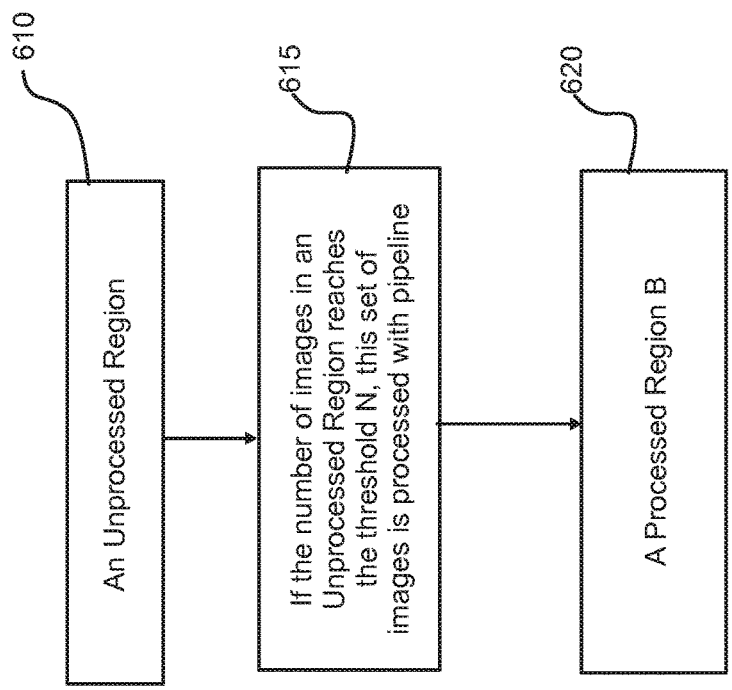
FIG. 6 shows an example of a process where an unprocessed region becomes a processed region.

The Unprocessed Region can become Processed Region (shown in FIG. 4 with reference 7), if the images in unprocessed region are successfully registered and corresponding point clouds are generated. This is illustrated in FIG. 6. When the number of images in the Unprocessed Regions 610 reaches the threshold N, this set of images is processed 615 with the coordinate tagging method according to the second process of related technology to have Processed Regions 620. The threshold may be for example 20. As a result, the rough camera poses are corrected to be accurate camera poses and the corresponding 3D point cloud is generated.

The client rendering (FIG. 4: 440) is configured to render the photo together with the corresponding "region data" for augmented reality applications. As examples of such augmented reality applications utilizing the photo and the corresponding region data, the following is provided:

1) City discovering: superimpose POI (Point of interest) information to the 3D scene. A use case according to an embodiment is as follows: When a tourist visits a place, s/he likes to discover the soundings with a wearable glass-like device with live camera. The client can automatically upload an image (or image features) to the server for camera pose recovery. Once the camera pose is recovered, in the client side, the POI information can be superimposed to 3D scene.

2) Zoom in for details: Once the pose of glass device is recovered in the client, a user can select a specific region in the view and zoom in to the details by display another image which is close to the selected region.

3) Different time or season or weather conditions at the same "region" to construct multiple global but "time/season" aware database.

Once the user's image is registered, the user is able to browse other images at different time and season with the same location.

Figure 14:
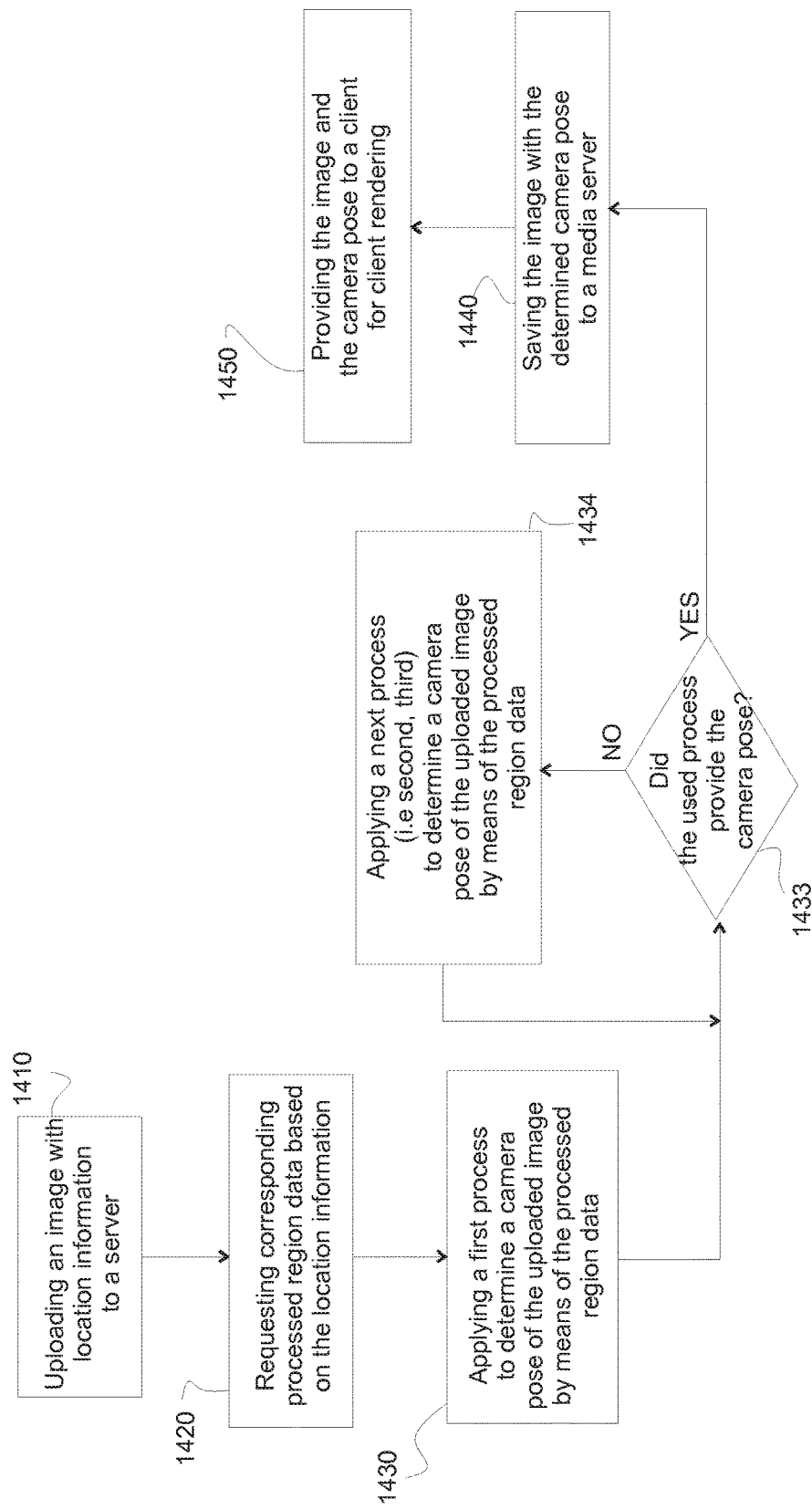
FIG. 14 shows a flowchart of a method according to an embodiment.

In previous, a method to fast track the recovery of global camera pose of outdoor images was disclosed (see FIG. 14). An intelligent media cloud, which is an example of a media server, is utilized to improve the efficiency and robustness of image registration. In the method an image with location information (e.g. GPS) is uploaded from a client to a server 1410. A corresponding processed region data is requested 1420 from a media server based on the location information. The processed region data comprises one or more images with the corresponding location information. For each uploaded image, and therefore also for the uploaded image in question, a first process is applied 1430 for determining a pose of a device of the uploaded image by means of the processed region data. If the first process does not result the pose of the device 1433, applying a second process 1434 for determining a pose of a device of the uploaded image by means of the processed region data. If the second process does not result the pose of the device 1433, applying a third process 1434 for determining a pose of a device of the uploaded image. After having determined the pose of the device either by means of a first, a second or a third process, the image with the determined pose of the device is saved to the media server 1440. The image and the pose of the device can then be provided to the client for client rendering 1450. The first process according to an embodiment is a fast localization pipeline. The second process according to an embodiment is a coordinate tagging method. The third process according to an embodiment is a sensor based approach.

An image being associated with the global camera pose can be exploited in image sharing service, such as e.g. social media. This may provide an intriguing user experience. In the following, an accurate global camera pose of indoor images is disclosed. Such embodiments provide an enhanced user experience allowing visual content to be positioned in the correct size/position/pose even when viewing from indoors to outdoors or vice versa. In addition, the embodiments enable seamless navigation between indoor and outdoor environments.

According to an embodiment, the processing can be divided into two main steps, named "Calculation of the indoor camera pose" and "Client rendering".

Figure 7:
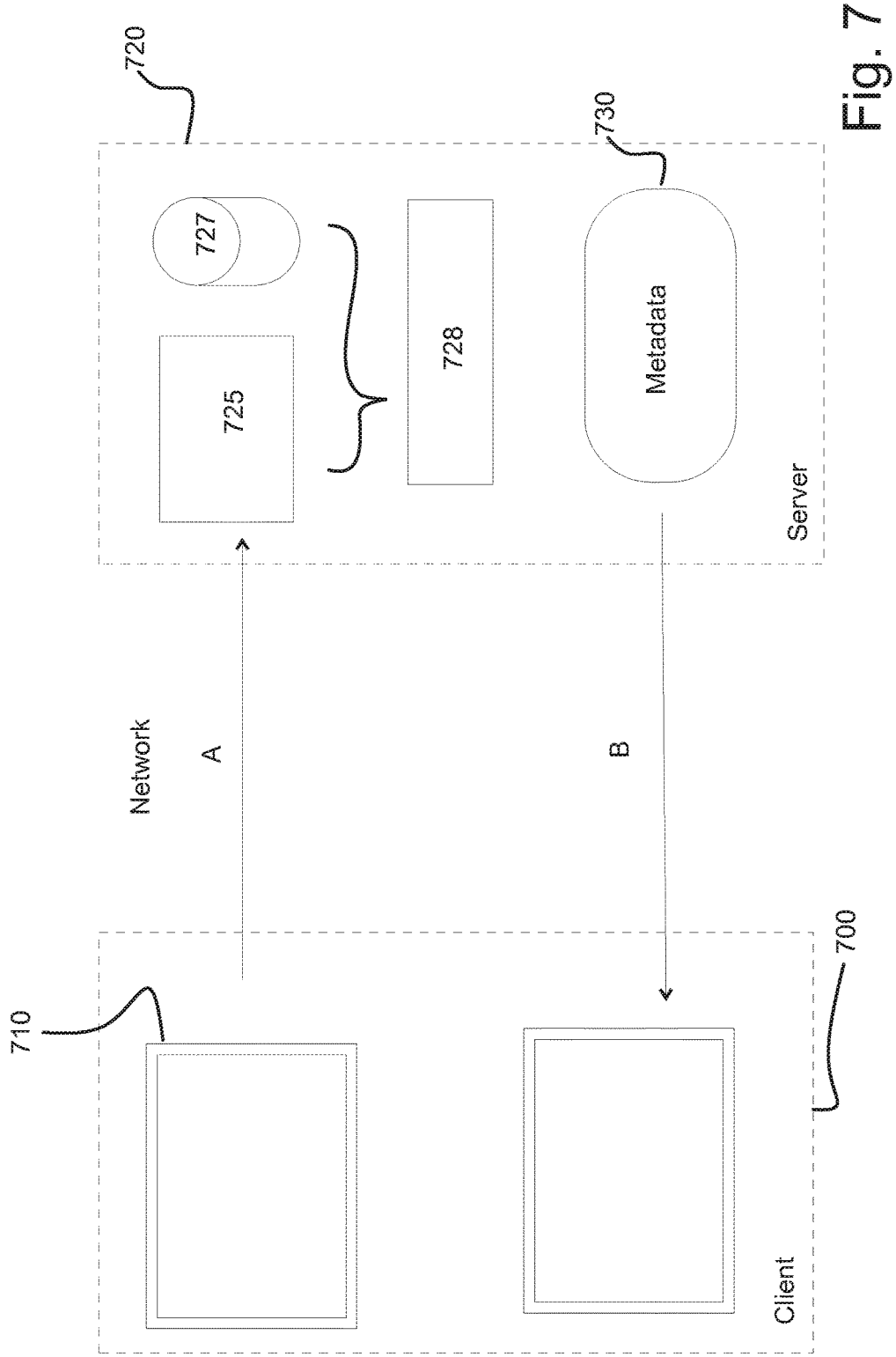
FIG. 7 shows an example of a camera pose calculation for indoor image(s)

FIG. 7 illustrates the Calculation of the indoor camera pose. At first the client 700 takes an indoor image 710 and uploads A it to the server 720. In the server side 720, the indoor image 725 together with the registered media database 727 is used as input to a tagging engine 728. The tagging engine 728 calculates the global camera pose of the indoor image and returns B the metadata 730 back to the client. The metadata 730 may comprise at least one of the following: the global camera pose, field of view, focal length, depths and image aspect.

Figure 8:
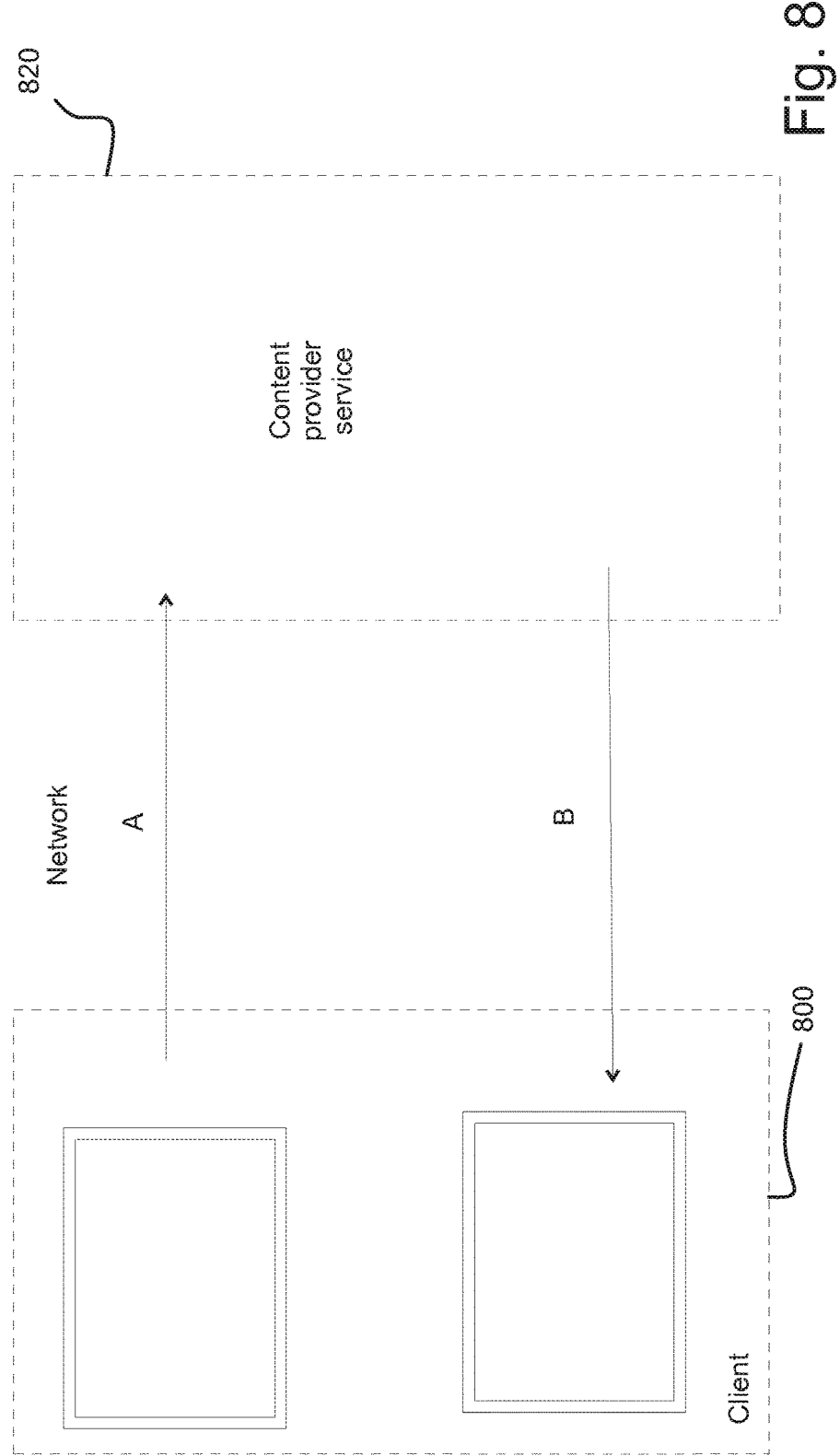
FIG. 8 shows an example of a client rendering.

FIG. 8 illustrates the Client rendering. The client 800 requests A the media content based on the global camera pose of the indoor image. The content provider service 820 transmits B the content, and the client 800 renders the indoor image in the client 800.

Figure 9:
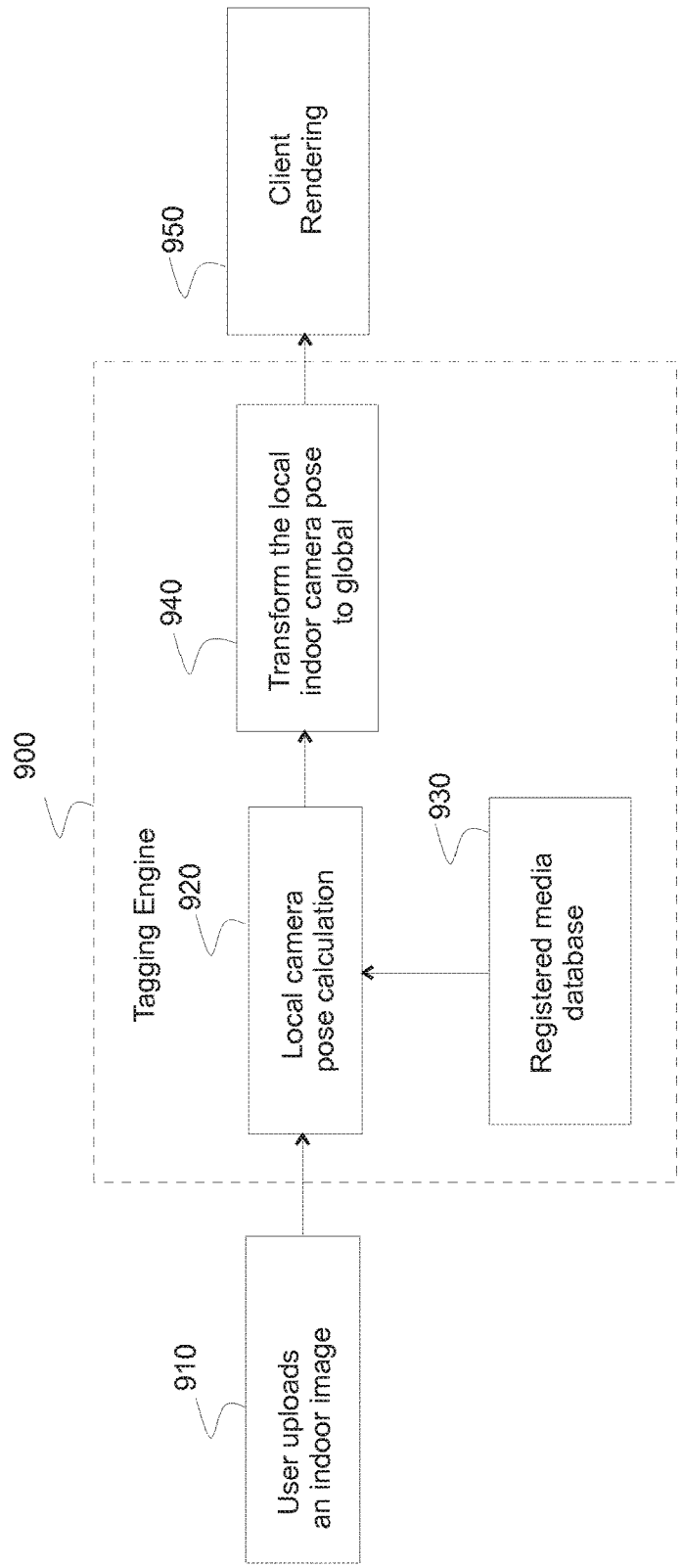
FIG. 9 shows an embodiment of components in a tagging engine.

The tagging engine (FIG. 7: 728) is discussed in more detailed manner with reference to FIG. 9. The tagging engine 900 comprises data processing components, i.e. registered media database 930, Local camera pose calculation 920 and transform the local indoor camera pose to global 940.

The (geo-registered) registered media database 930 is a database that contains media data, including images and point clouds of indoors environments. The images have global coordinates in CCS_3D_ECEF. The registered media database 930 is generated as follows:

The indoor media (images and point clouds) can be captured with an image capturing device. An example of the image capturing device is a traveling robot comprising a Kinect sensor and cameras.

With the predefined route for the robot on the floor plan, the position of the point cloud and camera pose can be accurately defined with regarding to the building.

In order to define the media data in coordinates, such as for example CCS_3D_ECEF, the indoor media data and the outdoor street data are connected. The robot may travel through the entrances and capture image data of the surroundings outside environment. After this, the entrance will be globally fixed by visual match to the outside images. Instead or in addition to, the robot may capture images through the windows of the building to get a visual match to the outside images.

Similarly, if there is more than one floor in the building, the robot can travel through the stairs, so the media data in different floors can be connected.

Since the outdoor images and the indoor images are connected, all the indoor media data can be defined in coordinates, e.g. CCS_3D_ECEF, and stored them into the registered media database which will be used for localization of other indoor images.

Figure 12:
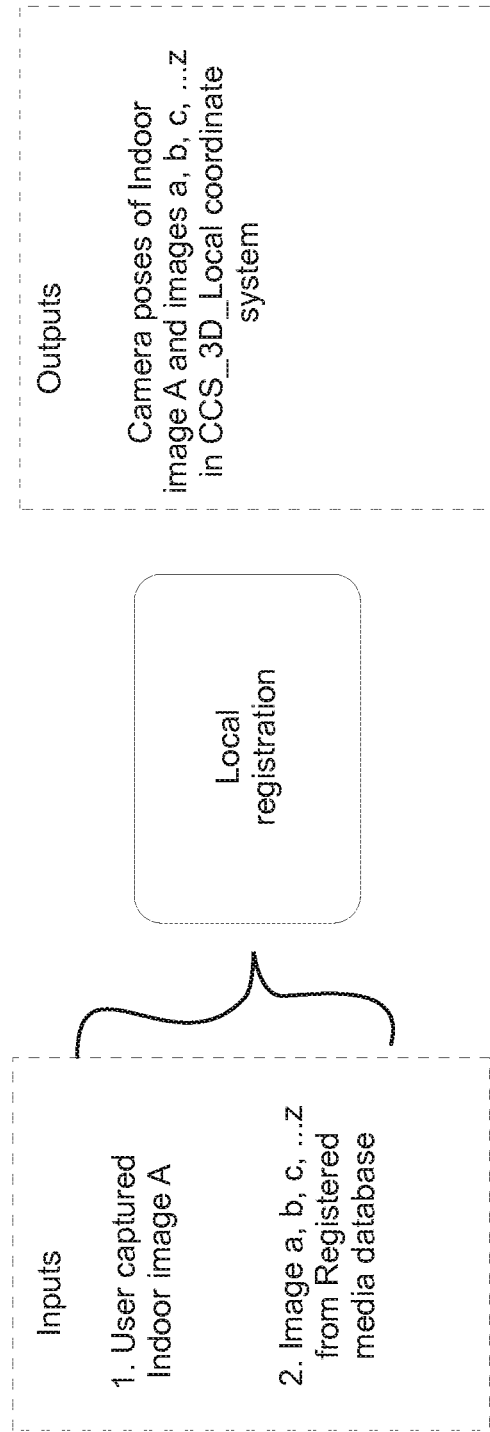
FIG. 12 shows an example of the inputs and output of local registration component.

Local camera pose calculation 920 is disclosed next. Given an indoor image from a user, the tagging engine 900 is configured to firstly locate this indoor image with the help of the near media data from the registered media database 930. This step can be done with structure from motion techniques. In this step, both the user captured indoor images (e.g. image A) and the images (e.g. image a, b, c, . . . z) from the Registered media database are used as inputs, and the output are their camera pose in CCS_3D_local coordinate system. This is illustrated in FIG. 12.

Transform the local indoor camera pose to global 930 is disclosed next. The purpose of this step is to get the camera pose of indoor image in CCS_3D_ECEF coordinates. As shown in FIG. 12, the camera pose of two source images are all in CCS_3D_local coordinates. However, the images (image a, b, c, . . . z) from Registered media database also have the camera pose in CCS_3D_ECEF coordinates. Then, it is possible to find a transform M from the CCS_3D_local coordinates to CCS_3D ECEF coordinates. Therefore, the transform M can be applied to indoor image (e.g. image A in FIG. 12) for obtaining its global camera pose in CCS_3D_ECEF coordinates.

After the local to global transform, substantially all geo-metadata in global coordinate system is obtained, including the global camera pose of indoor image, field of view, focal length, depth and image aspect.

Based on the output of tagging engine, the indoor image can be rendered in different use cases. Examples are given below:

1. An augmented reality application for seeing through building walls: Firstly POI information can be superimposed, which indicates the globally registered indoor images on the camera viewfinder. The POIs inside buildings can be added in the correct location, perspective, and pose. For example, a POI may comprise an advertisement or display inside a building. Then, if the user selects one POI, then all the obstacles between the user and the selected POI are faded away. Because the current view and the selected indoor image are all globally located with 6 DoF camera pose, it is able to calculate a path between these two images, the rendering effect may be applied, the current image in the viewfinder is faded away and the current view is gradually transited to the selected image view.

2. Street-view x-ray: a) Explore an indoor hot-spot. When a map is used to navigate on the street, the user can select a building and draw a rectangle 1310 on the wall to enable the see-through-effect 1320, as shown in FIG. 13. It is realized that by the see-through-effect, the user is able to see through the building wall and the indoor hotspot as if s/he had a direct line of sight to it. b) In some cases, indoor locations may have visual content such as advertisements or displays. According to present embodiments, the user is able to view these through the walls, while the displays/advertisements are kept in the correct position/orientation/pose because of the global indoor image registration. For example, viewing the headlines of a newspaper in a kiosk, updating the newspaper every day. The updating of the headlines can be done either base on real user images (if there are fresh user provided images of that indoor location that day) or then using computer graphics to modify the location in the image containing the headlines artificially, after retrieving the headline information from a service.

3. In some cases, when a user takes a photo from the street (or views through augmented reality), the system can automatically reveal views through some sections in building walls to the indoor visual hotspots. In this case, the system needs to determine, based on the user's current viewing camera pose, where is the location in the building wall where a hole needs to be made, and through which the user will see the visual hotspot. That is, the system automatically reveals some objects inside the buildings for the user. The difference to the previous is that the system will suggest to the user that there are visual hotspots available from user's view angle, and ask whether the user want to see them or not. The selection of which hotspots to show to the user may be based on the user preferences, such as hobbies or general interests. For example, a music enthusiast will see band advertisements through the walls of concert halls, a movie enthusiast will see movie advertisement through the walls of a movie theatre, etc.

4. Indoor images can be rendered by using a method of related technology for visualizing geo-located image and video galleries on 3D maps. An example of such a method is disclosed in U.S. Ser. No. 14/158,249. This method of related technology describes how to render high quality visual content where professionally generated street view content is augmented with user provided visual content. Present embodiments enable using the technique for indoor images as well. More specifically, use of indoor captured images for a mixed reality application, increasing the visual quality of image data and getting up-to-date image content. This is particularly suitable for the indoor environments changing frequently, such as movie theatre (obtaining images of users containing up-to-date information on the movie posters). For the rendering case, both the global camera pose of the registered image and the current viewing angle need to be known.

5. Indoor navigation, based on global camera pose and pointing position (orientation). Enables also starting navigation inside a building and continuing in a seamless manner outside the building. For example, consider routing a pedestrian from one large shopping mall to another, into a desired section. Correspondingly, routing a pedestrian from a street in a seamless manner to a certain indoor location. For example, sending the current position to a friend with a request to meet in that location.

The pipeline according to embodiments is illustrated in FIG. 9. Basically, once the user takes an indoor image with his/her mobile phone, the image is automatically uploaded to the tagging engine, and then the tagging engine generates the metadata (see FIG. 7). Finally, the image is rendered in the client.

The functionality of the tagging engine was discussed with reference to FIG. 9. The client rendering is discussed in the following. Rendering is a step giving the final appearance to animation. Given the metadata of the indoor image, the image can be rendered in the client side. This provides the camera parameters (field of view, camera pose, focal length) for each image, so any standard augmented reality rendering technique can be used.

As one example, Nokia City Lens augmented reality application, the augmented content is rendered on top of a live viewfinder view from the built-in camera of the device. The placement of the augmented content is calculated based on the position and orientation of the device, which in turn are estimated from sensor inputs: GPS, compass, accelerometer, and gyroscope. Alternatively, Nokia City Scene can be used in a similar fashion. Instead of a live camera view, City Scene uses previously captured panorama images and 3D models for its rendering.

Figure 15:
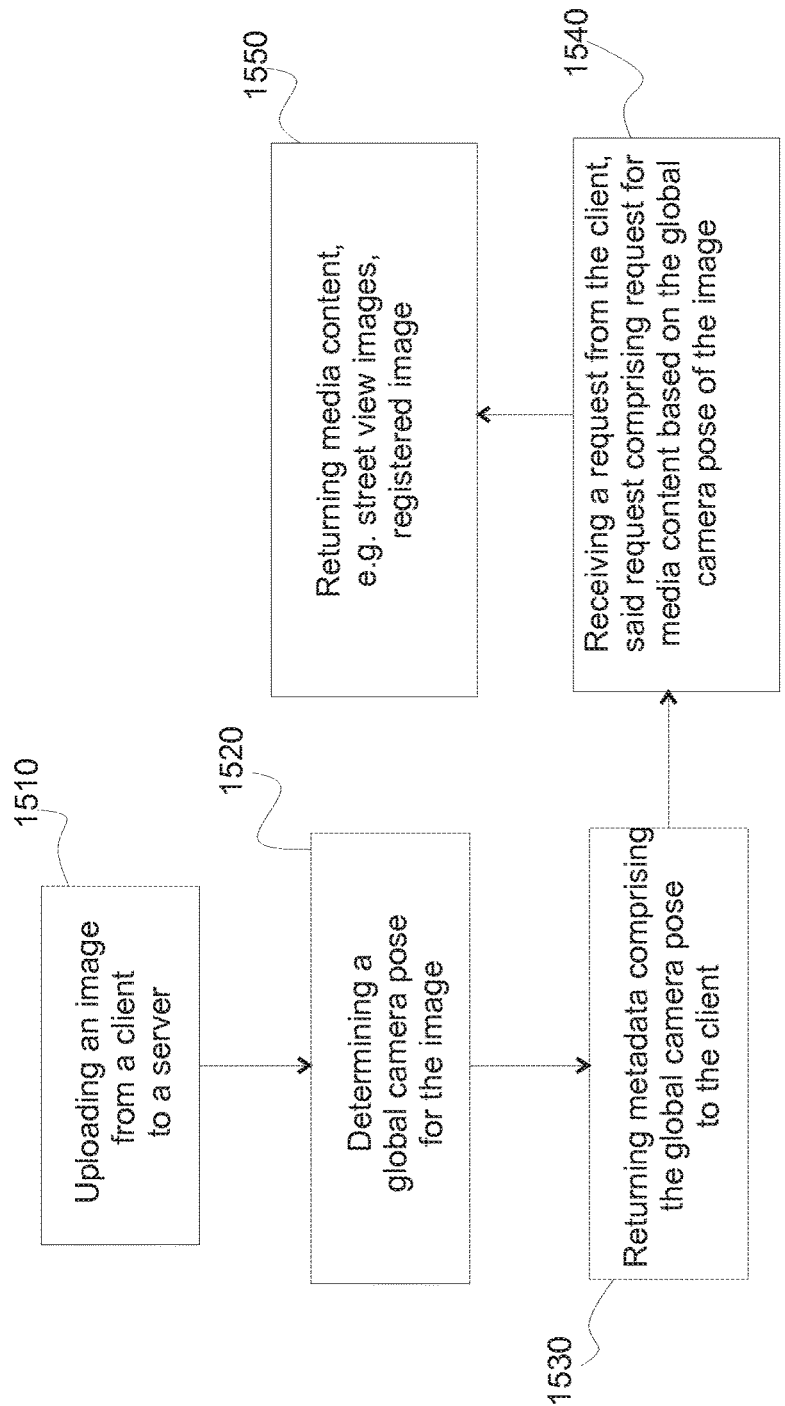
FIG. 15 shows a flowchart of a method according to another embodiment.

As a summary of the previous embodiment, there is a method for obtaining global camera pose for indoor images (See FIG. 15). Client takes an image and uploads it to the server containing registered media database (obtained using robot camera) 1510. According to an embodiment, the image is an indoor image. According to another embodiment, the image is an outdoor image. Using the image and registered media database, the method comprises calculating the local camera pose of the image as well as registered media database (using e.g. SFM technique) 1520. By using globally and locally registered media database, the method may apply transforms to the image for obtaining its global camera pose. The metadata comprising the global camera poser is returned to the client 1530. Another request from a client is received, which request comprises a request of media content based on the global camera poser of the image 1540. The media content, comprising e.g. street view images, registered image, is provided to the client 1550.

In the previous an embodiment for a hybrid real-time global camera pose recovery solution and an embodiment for obtaining a global camera pose for indoor/outdoor images have been discussed. It is appreciated that these embodiments can be combined to provide further embodiments.

The various embodiments may provide advantages. An efficient and robust hybrid camera pose is implemented to recover the global camera pose of images. For Glass related wearable device, it is very important to know exactly where the glass is looking at. Therefore, the global camera pose of view needs to be fast recovered. The present embodiments also provide enhanced user experience allowing visual content to be positioned in the correct size/position/pose even when viewing from indoors to outdoors and vice versa. The present embodiments also provide seamless navigation between indoor and outdoor environments.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
receiving an image with location information from a client;
requesting processed region data from a media server based on the location information, said processed region data comprising one or more images with the corresponding location information;
applying a first process for determining a pose of a device for the received image by means of the processed region data;
if the first process fails to result the pose of the device, applying a second process for determining a pose of a device for the received image by means of the processed region data;
saving the image with the determined pose of the device to the media server;
providing the image and the pose of the device to a client for client rendering;
wherein the media server comprises data categorized in processed regions and unprocessed regions; and further comprising
detecting when the images in the unprocessed region reaches a predefined threshold, wherein the threshold is greater than one image and wherein, in response to reaching the threshold, the method comprises processing and transferring the images from the unprocessed region to the processed region.

2. The method according to claim 1, wherein if the second process fails to result the pose of the device, applying a third process for determining a pose of a device for the received image.

3. The method according to claim 2, wherein the third process is a sensor based approach.

4. The method according to claim 1, wherein the first process is a fast localization method.

5. The method according to claim 1, wherein the second process is a coordinate tagging method or a sensor based approach.

6. The method according to claim 1, wherein the pose of the device determined either according to the fast localization method or the coordinate tagging method is saved with the image to the processed region.

7. The method according to claim 1, wherein the pose of the device determined according to the sensor based approach is saved with the image to the unprocessed region.

8. The method according to claim 1, wherein the image comprises a complete image or extracted image features.

9. The method according to claim wherein the media server is an intelligent media cloud.

10. The method according to claim 1, wherein image is an outdoor image.

11. The method according to claim 1, wherein the image is an indoor image.

12. The method according to claim 11, determining a local camera pose for the indoor image, and transforming the local camera pose to a global camera pose.

13. The method according to claim 1, wherein the device is a camera.

14. The method according to claim 1, wherein the image has been captured by the device.

15. The method according to claim 1, wherein the location information is related to the client and/or the device.

16. A computer program product embodied on a non-transitory computer readable medium, comprising computer program code configured to, when executed on at least one processor, cause an apparatus or a system to implement a method according to claim 1.

17. A system comprising at least one processor, memory including computer program code, the memory and the computer program code configured to, with the at least one processor, cause the system to perform at least the following:
receiving an image with location information from a client;
requesting processed region data from a media server based on the location information, said processed region data comprising one or more images with the corresponding location information;
applying a first process for determining a pose of a device for the received image by means of the processed region data;
if the first process fails to result the pose of the device, applying a second process for determining a pose of a device for the received image by means of the processed region data;
saving the image with the determined pose of the device to the media server;
providing the image and the pose of the device to a client for client rendering;
wherein the media server comprises data categorized in processed regions and unprocessed regions; and further comprising
detecting when the images in the unprocessed region reaches a predefined threshold, wherein the threshold is greater than one image and wherein, in response to reaching the threshold, the apparatus performs processing and transferring the images from the unprocessed region to the processed region.

18. The apparatus according to claim 17, wherein if the second process fails to result the pose of the device, the apparatus is further configured applying a third process for determining a pose of a device for the received image.

19. The apparatus according to claim 18, wherein the third process is a sensor based approach.

20. The apparatus according to claim 17, wherein the first process is a fast localization method.

21. The method according to claim 17, wherein the second process is a coordinate tagging method or a sensor based approach.

22. An apparatus comprising at least one processor, memory including computer program code, the memory and the computer program code configured to, with the at least one processor, cause the apparatus to perform at least the following:

receiving an image with location information from a client;

requesting processed region data from a media server based on the location information, said processed region data comprising one or more images with the corresponding location information;

applying a first process for determining a pose of a device for the received image by means of the processed region data;

if the first process fails to result the pose of the device, applying a second process for determining a pose of a device for the received image by means of the processed region data;

saving the image with the determined pose of the device to the media server;

providing the image and the pose of the device to a client for client rendering;

wherein the media server comprises data categorized in processed regions and unprocessed regions;

and further comprising detecting when the images in the unprocessed region reaches a predefined threshold, wherein the threshold is greater than one image and wherein, in response to reaching the threshold, the system performs processing and transferring the images from the unprocessed region to the processed region.

23. An apparatus comprising at least: means for processing;

means for storing;

means for receiving an image with location information from a client;

means for requesting processed region data from a media server based on the location information, said processed region data comprising one or more images with the corresponding location information;

means for applying a first process for determining a pose of a device for the received image by means of the processed region data;

if the first process fails to result the pose of the device, means for applying a second process for determining a pose of a device for the received image by means of the processed region data;

means for saving the image with the determined pose of the device to the media server;

means for providing the image and the pose of the device to a client for client rendering;

wherein the media server comprises data categorized in processed regions and unprocessed regions; and further comprising means for detecting when the images in the unprocessed region reaches a predefined threshold, wherein the threshold is greater than one image and wherein, in response to reaching the threshold, the apparatus comprises means for processing and transferring the images from the unprocessed region to the processed region.

24. A method for determining a pose of a device, comprising receiving an image from a client;

determining a global camera pose for the image;

returning metadata comprising at least the global camera pose to the client;

receiving a request from the client, said request comprising a request for media content based on the global camera pose of the image;

returning the media content to the client;

wherein determining a global camera pose for the image comprises requesting the metadata from a server, the server comprising data categorized in processed regions and unprocessed regions; and further comprising detecting when the images in the unprocessed region reaches a predefined threshold, wherein the threshold is greater than one image and wherein, in response to reaching the threshold, the method comprises processing and transferring the images from the unprocessed region to the processed region.

25. The method according to claim 24, wherein the image is an indoor image.

26. The method according to claim 24, wherein the image is an outdoor image.

27. The method according to claim 24, wherein the metadata further comprises at least one of the following: a field of view, focal length, depths, image aspect.

28. A computer program product embodied on a non-transitory computer readable medium, comprising computer program code configured to, when executed on at least one processor, cause an apparatus or a system to implement a method according to claim 24.

29. An apparatus comprising at least one processor, memory including computer program code, the memory and the computer program code configured to, with the at least one processor, cause the apparatus to perform at least the following:

receiving an image from a client;

determining a global camera pose for the image;

returning metadata comprising at least the global camera pose to the client;

receiving a request from the client, said request comprising a request for media content based on the global camera pose of the image;

returning the media content to the client;

wherein determining a global camera pose for the image comprises requesting the metadata from a server, the server comprising data categorized in processed regions and unprocessed regions; and further comprising detecting when the images in the unprocessed region reaches a predefined threshold, wherein the threshold is greater than one image and wherein, in response to reaching the threshold, the method apparatus is further caused to perfom processing and transferring the images from the unprocessed region to the processed region.

30. An apparatus comprising at least:

means for processing;

means for storing;

means for receiving an image from a client;

means for determining a global camera pose for the image;

means for returning metadata comprising at least the global camera pose to the client;

means for receiving a request from the client, said request comprising a request for media content based on the global camera pose of the image;

means returning the media content to the client;

wherein the means for determining a global camera pose for the image comprises means for requesting the metadata from a server, the server comprising data categorized in processed regions and unprocessed regions; and further comprising means for detecting when the images in the unprocessed region reaches a predefined threshold, wherein the threshold is greater than one image and wherein, in response to reaching the threshold, the apparatus comprises means for processing and transferring the images from the unprocessed region to the processed region.

* * * * *

UNITED STATES PATENT AND TRADEMARK OFFICE
CERTIFICATE OF CORRECTION

PATENT NO. : 10,102,675 B2
APPLICATION NO. : 15/319908
DATED : October 16, 2018
INVENTOR(S) : Lixin Fan et al.

Page 1 of 1

It is certified that error appears in the above-identified patent and that said Letters Patent is hereby corrected as shown below:

In Claim 9:
Column 16, Line 3, "claim" should be deleted and --claim 1-- should be inserted.

In Claim 17:
Column 16, Line 50, "apparatus" should be deleted and --system-- should be inserted.

In Claim 22:
Column 17, Line 27, "system" should be deleted and --apparatus-- should be inserted.

In Claim 29:
Column 18, Line 46, "method" should be deleted.

In Claim 29:
Column 18, Line 47, "perfom" should be deleted and --perform-- should be inserted.

Signed and Sealed this
Twentieth Day of November, 2018

Andrei Iancu
*Director of the United States Patent and Trademark Office*